(12) United States Patent
Anderson et al.

(10) Patent No.: US 9,798,700 B2
(45) Date of Patent: Oct. 24, 2017

(54) SYSTEM AND METHOD FOR EVALUATING DECISIONS USING MULTIPLE DIMENSIONS

(71) Applicant: Supported Intelligence, LLC, East Lansing, MI (US)

(72) Inventors: Patrick L. Anderson, East Lansing, MI (US); Jeffrey P. Johnson, East Lansing, MI (US)

(73) Assignee: Supported Intelligence, East Lansing, MI (US)

( * ) Notice: Subject to any disclaimer, the term of this patent is extended or adjusted under 35 U.S.C. 154(b) by 480 days.

(21) Appl. No.: 14/458,209

(22) Filed: Aug. 12, 2014

(65) Prior Publication Data

US 2016/0048765 A1  Feb. 18, 2016

(51) Int. Cl.
| | | |
|---|---|---|
| G06F 17/00 | (2006.01) | |
| G06F 17/16 | (2006.01) | |
| G06F 17/11 | (2006.01) | |
| G06Q 10/00 | (2012.01) | |

(52) U.S. Cl.
CPC ............. *G06F 17/16* (2013.01); *G06F 17/11* (2013.01); *G06Q 10/00* (2013.01)

(58) Field of Classification Search
CPC ........................................................ G06N 3/08
USPC ............................................. 706/12, 15, 45
See application file for complete search history.

(56) References Cited

U.S. PATENT DOCUMENTS

| | | | | |
|---|---|---|---|---|
| 2005/0041744 A1* | 2/2005 | Verhaegh | ............. | G06F 9/4887 375/240.26 |
| 2010/0082513 A1* | 4/2010 | Liu | ..................... | H04L 63/1458 706/46 |
| 2011/0302002 A1* | 12/2011 | Dance | ................ | G06Q 30/0201 705/7.35 |
| 2012/0030137 A1* | 2/2012 | Garcke | .................. | G06Q 40/04 705/36 R |

* cited by examiner

*Primary Examiner* — David Vincent
(74) *Attorney, Agent, or Firm* — Justin Schaudt

(57) ABSTRACT

A system and method for evaluating sequential decision problems that have multidimensional states. The system and method maximizes the value, as defined by the value functional equation, received by the user, for both finite and infinite horizon decision problems and provides decision making advice to the user based upon input actions, states, rewards and transition probabilities.

18 Claims, 9 Drawing Sheets

FIG. 3

Input (310) → Reward Matrix (320) → Transition Matrix (330) → Functional Equation (340) → Solve (350) → Output (360)

FIG. 4

State Dimension 1: $S1 = (s1_1, s1_2, s1_3)$

State Dimension 2: $S2 = (s2_1, s2_2)$

Reward Vector 1: $R1 = (r1_1, r1_2, r2_3)$

Reward Vector 2: $R2 = (r2_1, r2_2)$

Action Costs: $A = (ac_1, ac_2)$

Reward Matrix
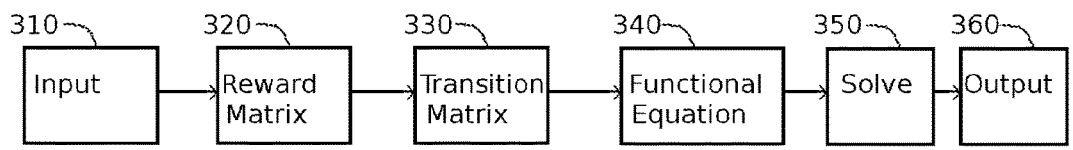
$$\begin{bmatrix} r1_1 \odot r2_1 \odot ac_1 & r1_1 \odot r2_1 \odot ac_2 \\ r1_2 \odot r2_1 \odot ac_1 & r1_2 \odot r2_1 \odot ac_2 \\ r1_3 \odot r2_1 \odot ac_1 & r1_3 \odot r2_1 \odot ac_2 \\ r1_1 \odot r2_2 \odot ac_1 & r1_1 \odot r2_2 \odot ac_2 \\ r1_2 \odot r2_2 \odot ac_1 & r1_2 \odot r2_2 \odot ac_2 \\ r1_3 \odot r2_2 \odot ac_1 & r1_3 \odot r2_2 \odot ac_2 \end{bmatrix}$$

FIG. 5

Price    Inventory    Action Costs $P_l$    $I_l$
$P_m$    $I_m$    $A_l$
$P_h$    $I_h$    $A_h$ Reward Matrix $$\begin{bmatrix} P_l \odot I_l \odot A_l & P_l \odot I_l \odot A_h \\ P_m \odot I_l \odot A_l & P_m \odot I_l \odot A_h \\ P_h \odot I_l \odot A_l & P_h \odot I_l \odot A_h \\ P_l \odot I_m \odot A_l & P_l \odot I_m \odot A_h \\ P_m \odot I_m \odot A_l & P_m \odot I_m \odot A_h \\ P_h \odot I_m \odot A_l & P_h \odot I_m \odot A_h \\ P_l \odot I_h \odot A_l & P_l \odot I_h \odot A_h \\ P_m \odot I_h \odot A_l & P_m \odot I_h \odot A_h \\ P_h \odot I_h \odot A_l & P_h \odot I_h \odot A_h \end{bmatrix}$$

FIG. 6

| State Dimension 1 Price | State Dimension 2 Inventory | Action Costs Advertising levels |
|---|---|---|
| 5 | 20 | 0 |
| 10 | 50 | 100 |
| 20 | 75 | 250 |

Reward Matrix with multiplication $$\begin{bmatrix} 5 \cdot 20 - 0 = 100 & 5 \cdot 20 - 100 = 0 & 5 \cdot 20 - 250 = -150 \\ 5 \cdot 50 - 0 = 250 & 5 \cdot 50 - 100 = 150 & 5 \cdot 50 - 250 = 0 \\ 5 \cdot 75 - 0 = 375 & 5 \cdot 75 - 100 = 275 & 5 \cdot 75 - 250 = 125 \\ 10 \cdot 20 - 0 = 200 & 10 \cdot 20 - 100 = 100 & 10 \cdot 20 - 250 = -50 \\ 10 \cdot 50 - 0 = 500 & 10 \cdot 50 - 100 = 400 & 10 \cdot 50 - 250 = 250 \\ 10 \cdot 75 - 0 = 750 & 10 \cdot 75 - 100 = 650 & 10 \cdot 75 - 250 = 500 \\ 20 \cdot 20 - 0 = 400 & 20 \cdot 20 - 100 = 300 & 20 \cdot 20 - 250 = 150 \\ 20 \cdot 50 - 0 = 1000 & 20 \cdot 50 - 100 = 900 & 20 \cdot 50 - 250 = 750 \\ 20 \cdot 75 - 0 = 1500 & 20 \cdot 75 - 100 = 1400 & 20 \cdot 75 - 250 = 1250 \end{bmatrix}$$

FIG 7.

| State Dimension 1 Price | State Dimension 2 Inventory | Action Costs Advertising levels |
|---|---|---|
| 5 | 20 | 0 |
| 10 | 50 | 100 |
| 20 | 75 | 250 |

Reward Matrix with addition $$\begin{bmatrix} 5+20-0=25 & 5+20-100=75 & 5+20-250=-225 \\ 5+50-0=55 & 5+50-100=-45 & 5+50-250=-195 \\ 5+75-0=80 & 5+75-100=-20 & 5+75-250=-170 \\ 10+20-0=30 & 10+20-100=-70 & 10+20-250=-220 \\ 10+50-0=60 & 10+50-100=-40 & 10+50-250=-190 \\ 10+75-0=85 & 10+75-100=-15 & 10+75-250=-165 \\ 20+20-0=40 & 20+20-100=-60 & 20+20-250=-210 \\ 20+50-0=70 & 20+50-100=-30 & 20+50-250=-180 \\ 20+75-0=95 & 20+75-100=-45 & 20+75-250=-155 \end{bmatrix}$$

FIG. 8

| State Dimension 1 Price | State Dimension 2 Inventory | Action Costs Advertising levels |
|---|---|---|
| 5 | 20 | 0 |
| 10 | 50 | 100 |
| 20 | 75 | 250 |

Reward Matrix with proportional cost $$\begin{bmatrix} 5 \cdot 20 - 20 \cdot 0 & 5 \cdot 20 - 20 \cdot 100 & 50 \cdot 20 - 20 \cdot 250 \\ 5 \cdot 50 - 50 \cdot 0 & 5 \cdot 50 - 50 \cdot 100 & 5 \cdot 50 - 50 \cdot 250 \\ 5 \cdot 75 - 75 \cdot 0 & 5 \cdot 75 - 75 \cdot 100 & 5 \cdot 75 - 75 \cdot 250 \\ 10 \cdot 20 - 20 \cdot 0 & 10 \cdot 20 - 20 \cdot 100 & 10 \cdot 20 - 20 \cdot 250 \\ 10 \cdot 50 - 50 \cdot 0 & 10 \cdot 50 - 50 \cdot 100 & 10 \cdot 50 - 50 \cdot 250 \\ 10 \cdot 75 - 75 \cdot 0 & 10 \cdot 75 - 75 \cdot 100 & 10 \cdot 75 - 75 \cdot 250 \\ 20 \cdot 20 - 20 \cdot 0 & 20 \cdot 20 - 20 \cdot 100 & 20 \cdot 20 - 20 \cdot 250 \\ 20 \cdot 50 - 50 \cdot 0 & 20 \cdot 50 - 50 \cdot 100 & 20 \cdot 50 - 50 \cdot 100 \\ 20 \cdot 75 - 75 \cdot 0 & 20 \cdot 75 - 75 \cdot 100 & 20 \cdot 75 - 75 \cdot 250 \end{bmatrix}$$

FIG. 9

Price Transition Matrix $$\begin{bmatrix} P_l \to P_l, A_1 & P_l \to P_h, A_1 \\ P_h \to P_l, A_1 & P_h \to P_h, A_1 \end{bmatrix} \begin{bmatrix} P_l \to P_l, A_2 & P_l \to P_h, A_2 \\ P_h \to P_l, A_2 & P_h \to P_h, A_2 \end{bmatrix}$$

Inventory Transition Matrix $$\begin{bmatrix} I_l \to I_l, A_1 & I_l \to I_m, A_1 & I_l \to I_h, A_1 \\ I_m \to I_l, A_1 & I_m \to I_m, A_1 & I_m \to I_h, A_1 \\ I_h \to I_l, A_1 & I_h \to I_m, A_1 & I_h \to I_h, A_1 \end{bmatrix} \begin{bmatrix} I_l \to I_l, A_2 & I_l \to I_m, A_2 & I_l \to I_h, A_2 \\ I_m \to I_l, A_2 & I_m \to I_m, A_2 & I_m \to I_h, A_2 \\ I_h \to I_l, A_2 & I_h \to I_m, A_2 & I_h \to I_h, A_2 \end{bmatrix}$$

Total Transition Matrix $$\begin{bmatrix} I_l \to I_l \cdot P_l \to P_l, A_1 & \cdots & I_l \to I_h \cdot P_l \to P_h, A_1 \\ \vdots & \ddots & \vdots \\ I_h \to I_l \cdot P_h \to P_l, A_1 & \cdots & I_h \to I_h \cdot P_h \to P_h, A_1 \end{bmatrix}$$

$$\begin{bmatrix} I_l \to I_l \cdot P_l \to P_l, A_2 & \cdots & I_l \to I_h \cdot P_l \to P_h, A_2 \\ \vdots & \ddots & \vdots \\ I_h \to I_l \cdot P_h \to P_l, A_2 & \cdots & I_h \to I_h \cdot P_h \to P_h, A_2 \end{bmatrix}$$

FIG 9A

First Transition Matrix $$S_1 \times S_1 \times A$$

Action 1
$$\begin{bmatrix} .5 & .5 \\ .5 & .5 \end{bmatrix} \text{Action 2}$$
$$\begin{bmatrix} .5 & .5 \\ .5 & .5 \end{bmatrix}$$

Second Transition Matrix $$S_2 \times S_2 \times A$$

Action 1
$$\begin{bmatrix} .9 & .1 & 0 \\ .8 & .1 & .1 \\ .7 & .2 & .1 \end{bmatrix} \text{Action 2}$$
$$\begin{bmatrix} .8 & .1 & .1 \\ .1 & .8 & .1 \\ .1 & .1 & .8 \end{bmatrix}$$

Total Transition Matrix $$(S_1 \cdot S_2) \times (S_1 \cdot S_2) \times A$$

$$6 \times 6 \times 2$$

$$\begin{bmatrix} .45 & .05 & 0 & .45 & .05 & 0 \\ .40 & .05 & .05 & .40 & .05 & .05 \\ .35 & .10 & .05 & .35 & .10 & .05 \\ .45 & .05 & 0 & .45 & .05 & 0 \\ .40 & .05 & .05 & .40 & .05 & .05 \\ .35 & .10 & .05 & .35 & .10 & .05 \end{bmatrix}$$

$$\begin{bmatrix} .40 & .05 & .05 & .40 & .05 & .05 \\ .05 & .40 & .05 & .05 & .40 & .05 \\ .05 & .05 & .40 & .05 & .05 & .40 \\ .40 & .05 & .05 & .40 & .05 & .05 \\ .05 & .40 & .05 & .05 & .40 & .05 \\ .05 & .05 & .40 & .05 & .05 & .40 \end{bmatrix}$$

FIG 12

State Dimension 1     State Dimension 2     Action costs $S1 = (s1_1, s1_2, s1_3)$     $S2 = (s2_1, s2_2)$     $A = (ac_1, ac_2)$ $$\begin{bmatrix} s1_1 \odot s2_1 \odot ac_1 & s1_1 \odot s2_1 \odot ac_2 \\ s1_2 \odot s2_1 \odot ac_1 & s1_2 \odot s2_1 \odot ac_2 \\ s1_3 \odot s2_1 \odot ac_1 & s1_3 \odot s2_1 \odot ac_2 \\ s1_1 \odot s2_2 \odot ac_1 & s1_1 \odot s2_2 \odot ac_2 \\ s1_2 \odot s2_2 \odot ac_1 & s1_2 \odot s2_2 \odot ac_2 \\ s1_3 \odot s2_2 \odot ac_1 & s1_3 \odot s2_2 \odot ac_2 \\ \text{absorbing state reward}, ac_1 & \text{absorbing state reward}, ac_2 \end{bmatrix}$$

FIG. 13

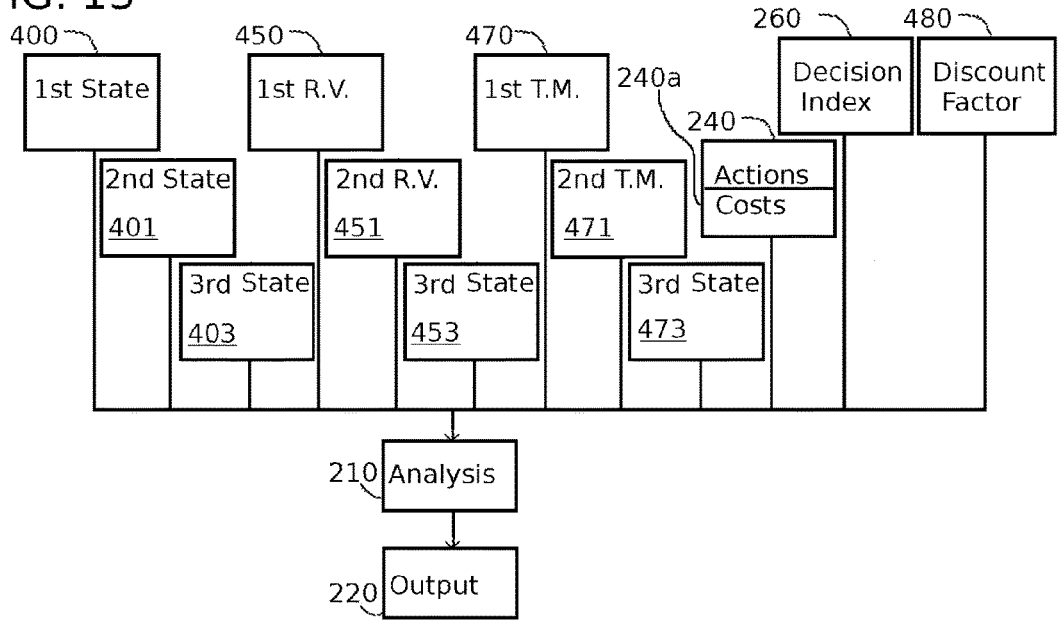

SYSTEM AND METHOD FOR EVALUATING DECISIONS USING MULTIPLE DIMENSIONS

BACKGROUND OF THE INVENTION

Field of the Invention

The present invention relates to a system and method for evaluating sequential decision problems that have multidimensional states, the evaluation providing a solution to maximize the value, as defined by the value functional equation, received by the user. In particular, the present invention relates to a system and method for solving sequential decision problems that have multidimensional states, where these states represent different sets of conditions that affect the decision problem.

Background

Decision makers including investors, business managers, public officials, entrepreneurs and private individuals regularly make decisions that require the decision maker to attempt to account for future events. The decision maker will take actions, such as choosing where to invest money, what policy to use, what product to market or what kind of investment to make based upon their prediction of future events. In the past, decision makers selected a course of actions based upon their experience and primitive heuristic rules-of-thumb, however decision makers continued to desire better tools.

With the development of computer hardware, software and the Internet, new tools were developed to enable decision makers to evaluate different possible courses. However, these tools fail when faced with multi-period decision problems having asymmetric risks and real options. In a multi-period problem the decision maker may take actions at many future points in time. In a problem with asymmetric risk the likelihoods of future events are not drawn from a symmetric distribution. For example, the upside risk may be greater than the downside risk, or vice versa. In a problem with real options the decision maker is given a chance to change the selected action at future points in time based upon the information gained from prior choices, learning as the problem evolves.

This failure is well known to decision makers, and various unsatisfactory tools have been developed. However, currently there is no known technique to handle multidimensional states representing different conditions while allowing for asymmetric risk and real options, as is often required by the real world.

SUMMARY OF THE INVENTION

The present invention relates to a system and method for evaluating sequential decision problems having multidimensional states.

In a disclosed embodiment a computer-aided decision making system is disclosed. The system has an input device, an output device and a processor programmed with instructions to evaluate a decision problem available to the user. The processor is programmed to receive inputs from the user, including a decision problem to be solved, a set of actions, a set of action costs and at least two state dimensions having elements representing values of a condition relevant to the decision problem. Each state dimension has a corresponding reward vector and a transition matrix. Each reward vector has elements representing the reward received by the user associated with the elements of the state dimension. Each transition matrix has elements representing the probability of moving from each state in the state dimension in one time period to each state in the state dimension in the next time period for each action in the action set. Additionally, the user inputs a time index containing decision points available to the user, each decision point representing a point in time when the user selects an action from the action set. The processor is programmed to combine the reward vectors with action cost set to form a reward matrix, and the transition matrices with the action set to form a total transition matrix. The processor is further programmed to form a functional equation from the reward matrix, the total transition matrix and the remaining inputs. The processor evaluates the functional equation to maximize the value received by the user and outputs decision making advice to the user, enabling the user to maximize the value received.

In another disclosed embodiment a method is provided for assisting a user in making a decision. The method includes the steps of providing the user with a computer system having an input device, an output device and a processor programmed with instructions to evaluate a decision problem available to the user. The processor is programmed to receive inputs from the user, including a decision problem to be solved, a set of actions, a set of action costs and at least two state dimensions having elements representing values of a condition relevant to the decision problem. Each state dimension has a corresponding reward vector and a transition matrix. Each reward vector has elements representing the reward received by the user associated with the elements of the state dimension. Each transition matrix has elements representing the probability of moving from each state in the state dimension in one time period to each state in the state dimension in the next time period for each action in the action set. Additionally, the user inputs a time index containing decision points available to the user, each decision point representing a point in time when the user selects an action from the action set. In a further step the processor combines the reward vectors with the action cost set to form a reward matrix, and the transition matrices with the action set to form a total transition matrix. In a still further step the processor forms a functional equation from the reward matrix, the total transition matrix and the remaining inputs. In another step the processor evaluates the functional equation to maximize the value received by the user and outputs decision making advice to the user, enabling the user to maximize the value received.

BRIEF DESCRIPTION OF THE DRAWINGS

FIG. 3. is a flowchart of a method of evaluating a decision problem having a multidimensional state.

FIG. 4. is a diagram of an exemplary embodiment of combining reward vectors.

FIG. 5. is a diagram of an example of combining reward vectors.

FIG. 6. is a diagram of an exemplary embodiment of combining the reward vectors.

FIG. 7. is a diagram of an exemplary embodiment of combining the reward vectors.

FIG. 8. is a diagram of an exemplary embodiment of combining the reward vectors.

FIG. 9. is a diagram of an example of a transition matrix.

FIG. 9A. is a diagram of an exemplary embodiment of combining the two transition matrices for a decision problem having a two dimensional state.

FIG. 12. is a flowchart of a method for evaluating a decision problem having a two dimensional state, where the user adds an absorbing function.

FIG. 13. is a block diagram of the combination of the inputs for evaluating a decision problem having a three dimensional state.

DETAILED DESCRIPTION OF THE INVENTION

Decision problems having multidimensional states closely reflect the way users and decision makers perceive the world. Evaluating such decision problems allows the user to account for multiple conditions at the same time while attempting to maximize the value received by the user. The ability to account for multiple conditions when evaluating a decision problem has the potential to improve decision making in many fields, including personal investment decisions, corporate and government policy choices, business investment decisions and many other problems which can be described as a Markov Decision Problem (MDP) having multidimensional states.

Multidimensional states are helpful in evaluating decision problems with multiple real world conditions that the user would like to account for when deciding what course of actions to take to maximize their value received. Some decision problems that can be analyzed using multidimensional states include:

(a) A business owner would like to decide on a month to month basis how much to spend on advertising to maximize the value of the business. The business may have different levels of inventory of a product on hand (a first state dimension), while also facing different market prices for the product (a second state dimension).

(b) An investor looks to invest an annuity to maximize the investor's financial goals. The investor receives annuity payments on a yearly basis. The investor may invest some or all of the money in stocks (a first state dimension), but would also like to consider the investor's personal health (a second state dimension). Additionally, the investor is worried about saving enough money to help the investor's children with their education costs (a third state dimension).

(c) A company produces a product from raw materials, but the material's price is highly volatile, changing rapidly on a week to week basis. The company would like to know what actions to take to maximize their profit, while accounting for demand for their product (a first state dimension) and the price of raw materials (a second state dimension).

(d) A person has a current job, but would like to pursue a new job in a variety of locations. The person would like to maximize their value while considering how their credentials (a first state dimension) and their location (a second state dimension) affect the gain from pursing and accepting a job offer.

(e) A technology start-up company wants to maximize the company's growth. The start-up would like to balance the evolving state of the technology (a first state dimension), their ability to fund research and development (a second state dimension), the public awareness of their product (a third state dimension) and the age of the founders (a fourth state dimension).

Figure 1:
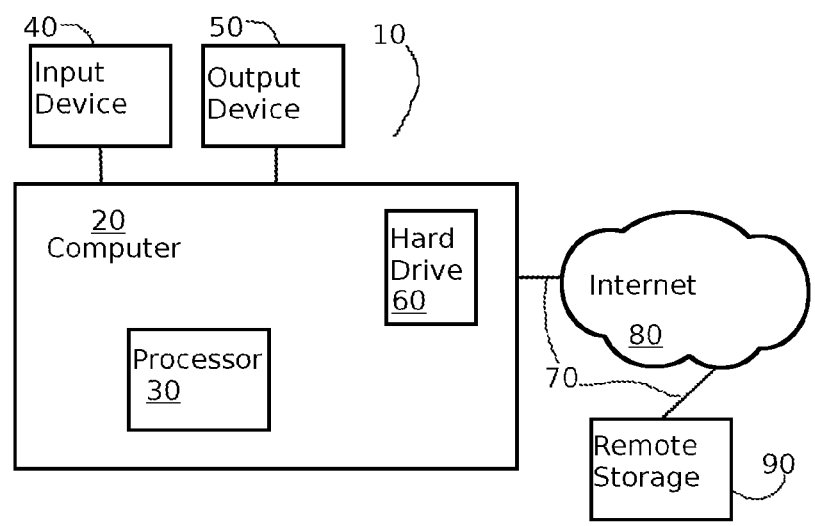
FIG. 1. is a block diagram of a computer system for executing a computer program for evaluating decision problems using multidimensional states FIG. 2. is a flow chart of the combination of the inputs for evaluating a decision problem having a multidimensional state.

The disclosed system and method may be implemented by a variety of computing systems 10 (FIG. 1). The computing system 10 has a computer 20. The computer 20 has a processor 30, an input device 40, an output device 50 and a hard drive 60. The computer 20 is capable of executing computer software (not shown) that programs the computer 20 to evaluate MDPs having multidimensional state inputs as described in this disclosure. The computer 20 may be a personal computer, laptop, desktop, smart phone, tablet, personal digital assistant, a networked server or any other similar device.

The computer software may be stored on a hard drive 60, or other local storage devices (not shown) such as a solid state drive, magnetic tape or optical storage. Additionally, parts of the computer system may be located remotely. For example, the computer software for programming the computing system 10 may be remotely stored in remote storage device 90 and accessed over a network 70. The network 70 may be a local network, a wide area network, a virtual private network, the internet or any combination of linked devices. For example, the computing system 10 may be on a local network connected to the internet connected to another local network connected to the remote storage device 90.

The processor 30 is any computer processor capable of executing computer software. The processor 30 does not refer specifically to a central processing unit, but may also refer to combinations of central processing units and graphics processing units or other combinations of electronic devices capable of processing information according to instructions provided by computer software.

The input device 40 inputs information into the computing system 10 from the user (not shown) or from other sources (such as over the network 70). The output device 40 outputs information from the computing system 10 to the user. The input device 40 and the output device 50 may be the same device. For example, a touchscreen monitor may be the input device 40 and the output device 50, as the touchscreen monitor is capable of displaying and receiving information. The input device 40 may be a mouse, a keyboard, voice control or gesture recognition or any other device capable of inputting information to the computer system 10. The output device 50 may be a computer screen, phone screen, monitor, television, printer, or any other device capable of outputting information from the computer system 10.

The disclosed system and method can be stored or provided as computer software to the user on a variety of computer-readable media, such as hard drives, solid state drives, optical discs, or any other computer-readable media capable of storing instructions for the processor. Additionally, the disclosed system and method may be transmitted electronically to the user over the network 70.

Figure 2:
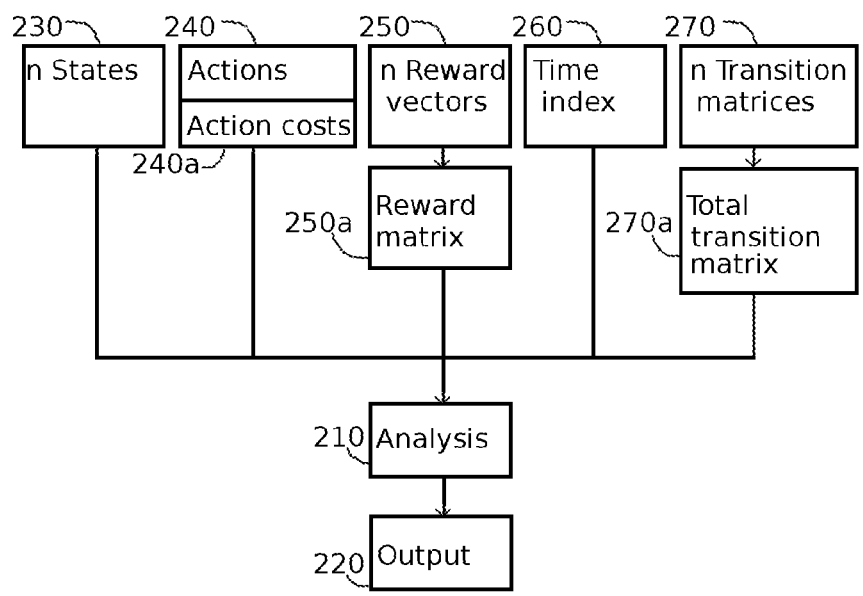

FIG. 2 is a flow chart showing the information input to the analysis engine 210. The user provides a set of n states 230, a set of actions 240, a set of action costs 240a, a set of n reward vectors 250, a time index 260, and a set of n transition matrices 270. The analysis engine 210 can evaluate the inputs, solving the decision problem defined by the inputs to find a policy that will lead to the maximum value.

In FIG. 2, and throughout this disclosure, n represents the number of dimensions to the decision problem that the user is having evaluated. Each dimension of the decision problem represents a condition that may affect the problem.

The set of n states 230 is the set of state dimensions that represent the conditions the user would like to consider when solving the decision problem to maximize the value. Each state dimension in the set of n states 230 should be as statistically independent from each other state dimension as possible. Two examples of state dimensions and the set of n states 230 are discussed below to further explain what a state dimension is, and to provide examples of what users may consider when attempting to solve a decision problem.

Returning to example (a), also discussed above, a business owner would like to decide on a month to month basis how much to spend on advertising. The business may have different levels of inventory of a product (a first state dimension), while also facing different market prices for selling the product (a second state dimension). In this example n is two. There are two state dimensions, because there are two different conditions affecting the decision problem being considered. One state dimension, inventory level will change the storage and labor costs, and depending on the business may also make affect the difficulty of selling the product. The other state dimension, market price, determines the price the business will receive for selling its product. Both the state dimensions, inventory kept on hand and market price, are conditions affecting the decision problem and should be considered when evaluating the decision problem to maximize the value received by the business.

More specifically, in example (a) the user could be a car dealership seeking to maximize the dealership's value over the next twenty four months. A car dealer has an inventory of cars on hand (one state dimension). The dealership may sell cars that are not on hand, however a consumer may be less likely to buy a car that is not on hand, because the consumer could not test drive the car. Therefore, the level of inventory of the product that the car dealer has on hand is a condition that affects the decision problem. The car dealer also has the power to set the price for the cars (another state dimension). The consumer will, all other factors being equal, buy the lowest price car. However all other factors are rarely equal. The dealer may be the only dealer of a specific car within a great distance, or the car dealer may have better advertising or more potent sales techniques. As a result the car dealer can choose from a range of prices while still potentially selling cars at many points within the range of prices. Therefore the price of the cars is also a condition that affects the decision problem and may be included as another state dimension of the problem. Additionally, the two state dimensions are almost completely independent of each other; while there may be some relationship between the car dealer's ability to carry inventory and price in the long run, in the short run they are independent and the car dealer may change one condition, for example raise the price of a car, without also changing the inventory level of the car.

In another example, (e) from above, a technology start-up company plans for the future. The start-up would like to balance the evolving state of the technology (a first state dimension), their ability to fund research and development (a second state dimension), the public awareness of their product (a third state dimension) and the age of the founders (a fourth state dimension). In example (e), n is four. There are four state dimensions, because there are four different conditions affecting the decision problem.

More specifically, in example (e) the technology start-up company user could be a group of smart phone application developers (the developers) seeking to maximize yearly growth for the next five years. The developers would like to consider the evolving state of the technology, which may be defined as the number of smart phone operating systems that capture at least 5% of the market for applications (important operating systems). The number of important operating systems may increase as more operating systems are released and become popular, or decrease if one or two operating systems become very dominant and control almost all applications sold. The number of important operating systems the developers must code their applications for will strongly correlate with the difficulty of releasing a new application to all of the important operating systems. Therefore, the number of important operating systems is a condition that affects their ability to maximize yearly growth and may be included as a state dimension when evaluating the decision problem.

The developers would also like to consider their ability to fund research and development into new tools to aid them in developing applications across multiple platforms (cross platform R&D). The level of cross platform R&D is a condition that will affect their future ability to produce applications for numerous different hardware models, affecting their ability maximize yearly growth for the next five years. Therefore, the level of cross platform R&D is a condition that affects the decision problem and may be included as a state dimension when evaluating the decision problem.

The developers would also like to consider the public awareness of their product. The public awareness is a condition that will affect the developers' ability to sell applications, and sales provide cash to fund future growth. Therefore the public awareness, perhaps as a function of advertising or articles written about the developers in the press, is a condition that will affect their ability to maximize yearly growth and may be included as a state dimension when evaluating the decision problem.

Finally, the developers would also like to consider the age of the founders. The founders may make up the core of the developers, or represent the majority of their industry contacts. As the founders grow older they may be more likely to retire, become sick or decide to pursue a stable job instead of working at a potentially risky start-up. Because of the founders' importance to the developers and the increased likelihood of the founders leaving as they age, their age affects the ability of the developers to maximize growth. Therefore, founder age is a condition that will affect their ability to maximize yearly growth and may be included as a state dimension when evaluating the decision problem.

The above two examples are merely illustrative of what a state dimension is. The two examples are not intended to imply that there may be only two or four dimensions or that the above examples of state dimensions are the only conditions applicable to this system and method.

Additionally, each state dimension from the set of n states 240 has a length, the number of different states in the state dimension. For example, a state dimension might be temperature and the states could be freezing, chilly, warm and hot. The temperature state dimension has a length of four because it has four states.

The time index 260 is a set of decision points, discrete moments in time, when the user chooses an action from the set of actions 240. In example (a), discussed above, the car dealership could use a monthly time index, where the dealership takes one action at the beginning of every month for the duration of the decision problem. In example (e), discussed above, the developers could use a yearly time index, with one decision point per year. The decision points do not need to be equally spaced. The developers could have one decision point on the first of every month for a year and then three per year for the remaining time. At each point in the time index 260 the user is in a combination of state dimensions. For example, suppose a person is considering going outside for a walk, or running on an indoor treadmill. The set of states the person would like to consider might be weather (a first state dimension), temperature (a second state dimension) and hunger (a third state dimension). At each moment in the time index the person is in a state defined by one element from each of the state dimensions (such as hungry, hot and raining). As the number of decision points increase the complexity of the problem increases, and the amount of processing power needed to solve the problem will likewise increase. Additionally, the time horizon of the problem may be definite or infinite.

The set of actions 240 is the set of actions that the user selects from, at each point in the time index 260. At each decision point the user is in a combination of state dimensions and selects one of the available actions with the end goal to maximize the value received by the user. The user receives a reward determined by the set of n reward vectors 250 and the action costs 240a, and transitions (according to the probabilities in the set of n transition matrices 270) to a state at the next decision point. The new state may be the same state, or a different state. Some of the actions in the set of actions may only be available to the user in some states, or may only be selected by the user one time, or a set number of times. In example (a), discussed above, the set of actions 240 may be levels of advertisements. The car dealership could advertise a low, medium or high amount. Furthermore, in example (a) the action costs 240a may be none, (corresponding to a low amount of advertising), medium (corresponding to a medium amount of advertising) or high (corresponding to a high amount of advertising).

The set of n reward vectors 250 represents the value received by the user when the user selects an action from the set of actions 240, with the goal of maximizing value, in a state from the set of n states 230, at the decision point that the user is in from the time index 260. The set of n reward vectors contains a reward for every state in every state dimension of the set of n states 240. The set of n reward vectors 250 may be in terms of profit to an owner, or company growth, or any other terms that the user desires to maximize.

In example (a), discussed above, there is a first state dimension for inventory and a second state dimension for price. Each state in the first state dimension (inventory) will have a corresponding reward in the first reward vector. Likewise, each state in the second state dimension (price) will have a corresponding reward in the second reward vector. The length of any nth state dimension is the same as the length of the corresponding nth reward vector.

The set of n transition matrices 270 is a set of matrices. Each nth matrix in the set of n transition matrices 270 contains the likelihood of transitioning from each state in the nth state dimension to every state in the nth state dimension (including the current state) when an action from the set of actions 240 is selected.

For example, if there are three actions and a state dimension has four elements (length 4), then the corresponding transition matrix is a 4×4×3 matrix (here we use 4×4×3 to mean 3 dimensional matrix, with four rows, four columns and 3 frames). If there were two actions and the state dimension matrix had five states, then the corresponding transition matrix would be a 5×5×2 matrix. In example (a), discussed above, the set of n transition matrices 270 would have two matrices, one for inventory and one for price. If there are three levels of inventory (length of three) and two price levels (length of two) and three actions available, then the set of n transition matrices would contain a 3×3×3 matrix for inventory and a 2×2×3 matrix for price. In this illustrative embodiment the (i,j,k)'th element of a nth transition matrix represents the probability of moving from the i state to the j state, when action k is chosen, however other arrangements are possible.

The analysis engine 210 represents an electronic system capable of receiving and evaluating the inputs (set of n states 230, set of actions 240, set of n reward vectors 250, time index 260 and set of n transition matrices 270), processing the inputs to form a functional equation and evaluating the functional equation to maximize value received by the user.

The output 220 block represents an electronic system capable of outputting the results to the user. The results may be in the form of the actions that the user should take from the set of actions 270, and the points in the time index 260 at which the user should take the actions, as well as the value in each state for taking the recommended action. The output could be in the form of a list, or a graph showing the best course of actions and related values, or any other suitable way of displaying the data.

FIG. 3. shows a flowchart of a disclosed method. Step 310 accepts input from the user. The input accepted at step 310 includes the set of n states 230, the set of actions 240, the set of action costs 240a, the set of n reward vectors 250, the time index 260 and the set of n transition matrices 270. In step 320 the n reward vectors 250 (input at step 310) are combined with the set of action costs 240a into a reward matrix 250a. At step 330 the set of n transition matrices 270 are combined with the set of actions 230 into a total transition matrix 270a. At step 340 the set of n states 230, the set of actions 240, the reward matrix 250a, the time index 260 and the total transition matrix 270a are processed into a functional equation. At step 350 the functional equation is evaluated to maximize the value received by the user. At step 360 the solution is output to the user.

The input step 310 may be performed by many computer input devices, such as scanners, keyboard, computer mice, voice control or touchscreen, etc. The user may be prompted for each individual input (for example, first prompted for the set of n states 230 and then for the set of actions 240 and so on) or the user may input all of the inputs at once. The user may be prompted to select among optional inputs such as numbers of states, different solution methods or error checking (for a further discussion of solution methods and error checking see Anderson, U.S. Patent Application Publication 2012/0310872, specifically FIGS. 8, 9, 13 and 14, which is herein incorporated by reference). Additionally, the user may be presented with advice on how to view a problem as a multidimensional issue, to be broken down into different states (with corresponding reward vectors and transition matrices). The input accepting step 310 may prompt the user to input options such as a discount rate, an absorbing state or a user defined reward combination function. The inputs accepted in step 310 may be stored in any format, such as a matrix or any other format offering computational efficiency, storage efficiency or convenience.

The reward combination step 320 combines the set of n reward vectors 250 into a reward matrix 250a. In the figures the symbol "⊙" is used to represent a generalized form of combination. FIG. 4 shows one possible arrangement of the reward matrix 250*a*, for a problem where the user has used the computer input device to input two state dimensions, although the user could have selected to input more state dimensions.

FIG. 5 shows the reward combination step 320 using the embodiment depicted in FIG. 4. FIG. 5 follows on example (a), where a car dealership would like to maximize value while balancing market price (low, medium, high) with inventory levels (low, medium and high) and is considering two different levels of advertising, each level of advertising having an associated action cost (low and high). The first state dimension is price with a reward vector of length three, the second state dimension is inventory with a reward vector of length three, therefore the reward matrix under the embodiment depicted in FIG. 4 and FIG. 5 is a 9×2 matrix.

The transition matrix combination step 330 combines the set of n transition matrices 270 into a total transition matrix 270*a*. FIG. 9 shows one way of combining the set of n transition matrices 270 into the total transition matrix 270*a*, for a two dimensional state decision problem. In FIG. 9 there is a first state dimension (S1) with a length of two, a second state dimension (S2) with a length of three, and two actions. The total transition matrix shown in FIG. 9 has the dimensions of [(length(S1)×length(S2))×(length(S1)×length(S2))×# of actions]. FIG. 9 shows one way of combining the set of n transition matrices 270 into a total transition matrix 270*a*.

In this arrangement the (i,j,k) element of a nth transition matrix represents the probability of moving from the i state to the j state, when action k is chosen. Likewise, the total transition matrix contains, for all combinations of states and actions, the probability of moving from each state to every state.

FIG. 9*a* shows the transition matrix combination step 330 for example (a), discussed above, using the embodiment depicted in FIG. 9. The car dealership would like to maximize its value by balancing market price levels (low and high) with inventory levels (low, medium and high) and is considering two different levels of advertising (action one, a low amount of advertising and action two, a high amount of advertising). In this example of a two dimensional decision problem the total transition matrix has the dimensions of 6×6×2, and the total transition matrix contains every combination of price transitions and inventory transitions for each action.

The combination step 340 creates a functional equation from the set of n states 230, the set of actions 240, the set of action costs 240*a*, the time index 260, the reward matrix 250*a* and the total transition matrix 270*a*. The functional equation is an equation that may be solved to maximize the value received by the user. The user may be prompted to select a solution technique, or a default solution technique can be set and used in the combination step 340 and the solution step 350.

The solution step 350 solves the functional equation created in step 340 and outputs the solution to the output step 360. The solution step 350 may use different solution techniques depending on the selected particular form of the functional equation created in step 340. Some solution techniques include value function iteration (also known as successive approximations, over-relaxation, or pre-Jacobi iteration) policy iteration, the root finding algorithm or many other numeric solution techniques.

The output step 360 displays the solution to the functional equation found in the solution step 350 to the user. The solution may be displayed via print-out, on screen graph, or any other suitable method of displaying information. The output step may prompt the user to try a different solution method or to consider changing one or more of the inputs.

Figure 14:
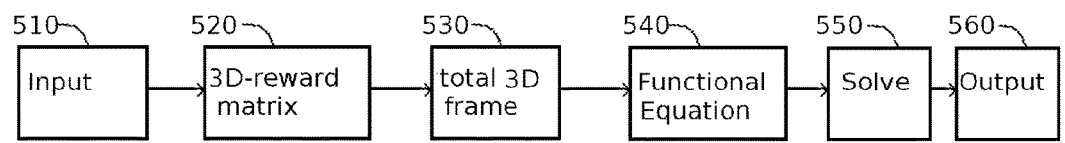
FIG. 14. is a flowchart of a method of evaluating a decision problem having a three dimensional state.

FIG. 13 and FIG. 14 show a block diagram and flowchart for an embodiment of a system and method for evaluating a three dimensional decision problem to maximize the value received by the user. The decision problem is defined by the inputs to the analysis engine 210. In step 510 the analysis engine 210 takes input from a user. The inputs taken in step 510 include a first state dimension 400, a second state dimension 401, a third state dimension 403, a set of actions 240, a set of action costs 240*a*, a first reward vector 450, a second reward vector 451, a third reward vector 453, a time index 260, a first transition matrix 470, a second transition matrix 471, a third transition matrix 473 and a discount factor 480. The inputs may be input as a data file, manually typed in, selected through dialog boxes, entered using natural language parsing or through any other known and suitable method to input data. For example, the user could be prompted to input a number of dimensions or asked how many different conditions affect a problem. In this example the user would say there are three kinds of factors affecting the problem, and in step 510 the user would be additionally prompted for the reward vectors, transition matrices and elements of the state dimensions that represent the different conditions affecting the problem.

The first state dimension 400 represents a condition that the user would like to consider when solving the decision problem. As discussed above a condition can be any factor the user would like to account for when solving the decision problem to maximize an expected discounted reward. The first state dimension has elements $(S1_1, S1_2, \ldots, S1_x)$, each element representing one aspect of the condition. Likewise, the second state dimension 401 has elements $(S2_1, S2_2, \ldots, S2_y)$, each element representing one aspect of a second condition. The third state dimension 403 has an analogous element set.

The first reward vector 450 represents the rewards received by the user when in one of the states from the first state dimension 400. The first reward vector 450 has elements $(R1_1, R1_2, \ldots, R1_x)$ representing the rewards for the first state dimension 400.

The second reward vector 451 represents the reward received by the user when in one of the states from the second state dimension 401. The second reward vector 451 has elements $(R1_1, R1_2, \ldots, R1_y)$ representing the rewards for the second state dimension 401. The third reward vector dimension 453 has an analogous element set.

The set of actions 240, action costs 240*a* and the time index 260 are the same as in FIG. 2 and are discussed above.

The first state transition matrix 470 represents the likelihood of moving from each of the states in the first state dimension 400 to every state in the first state dimension 400, when the user takes an action from the set of actions 240. The first state transition matrix 470 may be in the form of a [x×x×# of actions in the set of actions 240] matrix.

The second state transition matrix 471 represents the likelihood of moving from each of the states in the second state dimension 401 to every state in the second state dimension 401, when the user takes an action from the set of actions 240. The second state transition matrix 471 may be in the form of a [y×y×# of actions in the set of actions 240] matrix analogous to the first state transition matrix. The third transition matrix 473 is analogous to other transition matrices.

The discount factor 480 represents a discounting to present value of the rewards received by the user. Essentially, the discount factor 480 represents the user's preference for larger rewards at a later time (e.g. a later point in the time index 260) or smaller rewards at a closer time (e.g. a closer point in the time index 260). The discount factor 480 may be input in several ways, as a slider bar where the user their preference from closer to further, or a dialog box where the user selects from options (e.g. very soon, soon, later, very late) or as a number.

In step 520 the analysis engine combines the first reward vector 450, the second reward vector 451, the third reward vector 453 and the set of action costs 240*a* to form a 2D-reward matrix. The 2D-reward matrix represents the rewards received by the user when in every combination of state elements from the first state dimension 400, the second state dimension 401, the third state dimension 403, and for each action in the set of actions 240.

In step 530 the analysis engine combines the first transition matrix 470, the second transition matrix 471 and the set of actions 240 to form a total 3D matrix. The total 3D matrix represents the likelihood of transitioning between every combination of states from the first state dimension 400, the second state dimension 401 and the third state dimension 403, for each action in the set of actions 240. One way of combining the first transition matrix 470, the second transition matrix 471, the third transition matrix 473 and the set of actions 240 to form the total 3D matrix is depicted in FIG. 9, with a first transition matrix representing a first state dimension with two states, and a second transition matrix representing a second state dimension with three states and two possible actions.

In step 540 the analysis engine composes the first state dimension 400, the second state dimension 401, the third state dimension 403, the set of actions 240, the time index 260, the discount factor 480, the 3D-reward matrix and the total 3D frame into a functional equation. The functional equation is an equation that may be evaluated to maximize the value received by the user.

In step 550 the analysis engine 210 solves the functional equation to maximize the value received by the user. The solution step 550 may use different solution techniques. Some solution techniques include value function iteration (also known as successive approximations, over-relaxation, or pre-Jacobi iteration) policy iteration, the root finding algorithm or many other numeric solution techniques.

In step 560 the analysis engine 210 outputs the solution from step 550 to the user. The solution may be displayed via print-out, on screen graph, or any other suitable method of displaying information. The output step may prompt the user to try a different solution method or to consider changing one or more of the inputs.

In an alternative embodiment the set of n reward vectors 250 is combined via addition and the set of action costs 240*a* is subtracted out. This embodiment is depicted in FIG. 7 for a two dimensional problem. The addition based reward matrix is formed in step 520, where the analysis engine 210 combines the first reward vector 450 and the second reward vector 451 via element-by-element addition and subtracts the set of action costs 240*a* to form the addition based reward matrix.

In another alternative embodiment the set of n reward vectors 250 is combined via multiplication and the set of action costs 240*a* is subtracted out. This is depicted in FIG. 6 for a two dimensional problem. The multiplication based reward matrix is formed in step 520, where the analysis engine 210 combines the first reward vector 450 and the second reward vector 451 via element-by-element multiplication and subtracts the set of action costs 240*a* to form the multiplication based reward matrix.

In another alternative embodiment the set of n reward vectors 250 is combined via multiplication and set of action costs 240*a* is multiplied by a selected reward vector and subtracted out. This is depicted in FIG. 8 for a two dimensional problem where the user has selected the second of two reward vectors. The proportional cost reward matrix is formed in step 520 where the analysis engine 210 combines the first reward vector 450 and the second reward vector 451 via element-by-element multiplication and subtracts the set of action costs 240*a* multiplied by the corresponding reward from the second reward vector 451 to form a proportional cost based reward matrix.

Figure 10:
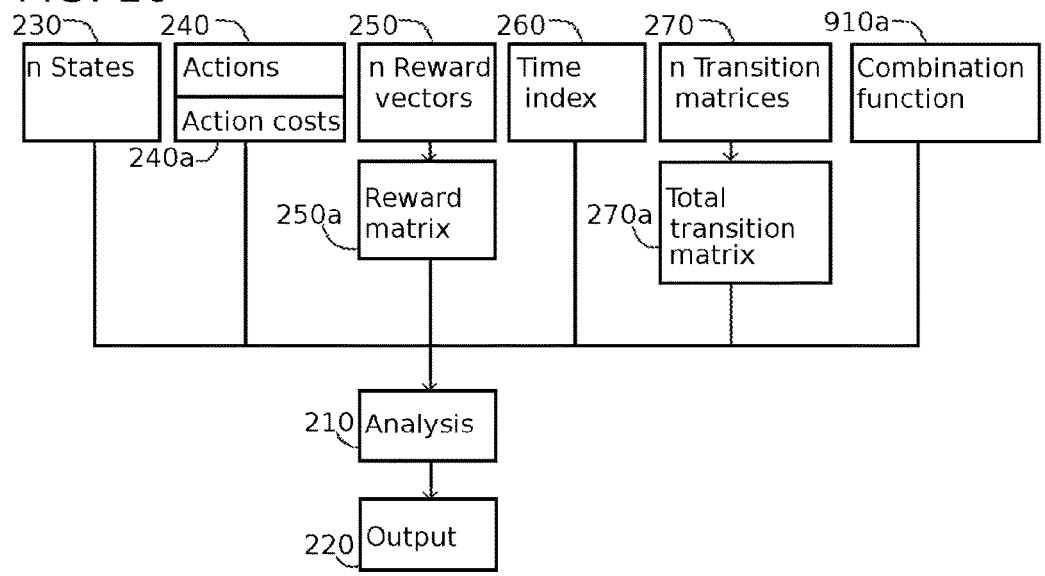
FIG. 10. is a block diagram of the combination of inputs for evaluating a decision problem having a two dimensional state, where the user may input an arbitrary reward combination function.

In another alternative embodiment (depicted in FIG. 10) the user inputs an optional custom combination function 910*a*. A custom combination function 910*a* is a function that combines the set of reward vectors 250 with the set of action costs 240*a*. The user is prompted to input the custom combination function 910*a* or to select another combination function (such as depicted in FIG. 6, 7 or 8). Then the analysis engine 210 combines the set of reward vectors 250 and the action costs 240*a* according to the selected combination function. The remaining steps are analogous to those depicted in FIG. 3. The use of a custom combination function 910*a* allows for very sophisticated models that take into account the particular mechanics of the user's situation and decision problem.

Figure 11:
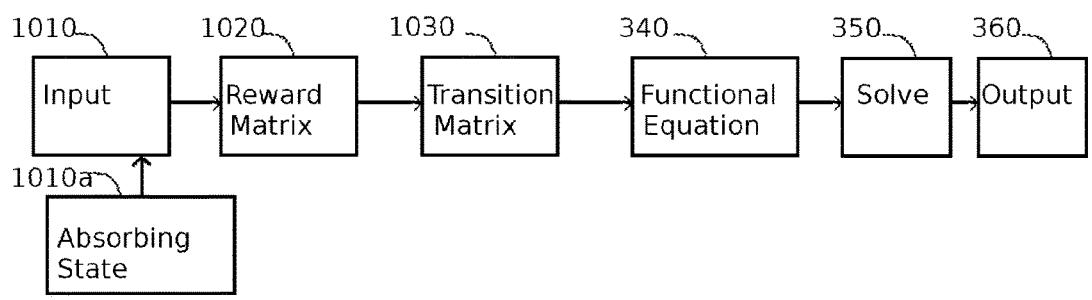
FIG. 11. is diagram of an exemplary embodiment of adding an absorbing state to the reward matrix for a decision problem having a two dimensional state.

In another alternative embodiment the user inputs an absorbing state. An absorbing state is a state representing a real option that may be exercised precisely once. In the embodiment depicted in FIG. 11 and FIG. 12 the absorbing state is optionally input in step 1010. The absorbing state input requires corresponding transition probabilities and rewards. FIG. 12 depicts an exemplary embodiment of how to combine the absorbing state's rewards into a reward matrix. In step 1010 the user is prompted for, or otherwise selects to insert, an absorbing state 1010*a*. The absorbing state 1010*a* will have a corresponding reward to be incorporated into the reward matrix with an absorbing state in step 1020 and a corresponding transition probability to be incorporated into a transition matrix with an absorbing state in step 1030. The remaining steps (340, 350 and 360) are analogous to the steps depicted in FIG. 3.

For example, a company has an ongoing manufacturing business, but also controls valuable intellectual property. The company faces licensing issues from a group of competitors for other essential intellectual property the company needs to continue the manufacturing side of its business. The group of competitors agree to dedicate their intellectual property to the public, if the company does so as well. The action of dedicating the company's intellectual property to the public is an absorbing state, because once the action is exercised the company many not exercise it again. Essentially, once the action is exercised there is no possibility of exercising or reversing the action again.

The order of the steps to perform the methods disclosed herein are merely illustrative; certain steps can be rearranged without deviating from the overall decision methodology. Additionally, many modifications and variations of the present disclosure are possible in light of the above teachings. Therefore the present disclosure may be practiced other than as specifically described and illustrated while still remaining with the scope of the claims.

What is claimed is:

1. A computer-aided decision making system, comprising:
   (a) a user input device;
   (b) a user output device; and
   (c) a processor programmed to evaluate decision problems available to a user, the programmed processor;
   (A) facilitating input of information from the user via the user input device, the information including
      (i) the decision problem to be solved to maximize a reward received by the user,
      (ii) an action set, the action set has elements representing actions available to the user, each element in the action set having a corresponding action cost, the corresponding action costs forming an action cost set,
      (iii) at least two state dimensions, each state dimension has elements representing values of a condition relevant to the decision problem,
      (iv) each state dimension having a corresponding reward vector, the corresponding reward vector has reward elements representing the reward to the user associated with each of the elements of the corresponding state dimension,
      (v) each state dimension having a corresponding transition matrix, the corresponding transition matrix containing, for each element in the state dimension, a probability of moving from each state in the state dimension to each state in the state dimension for each action in the action set, and
      (vi) a time index, the time index containing decision points available to the user, each decision point representing a point in time when the user selects from the action set;
   (B) the programmed processor combining the reward vectors with the action cost set to form a reward matrix and the programmed processor combining the transition matrices with the action set to form a total transition matrix;
   (C) the programmed processor forming a functional equation from the state dimensions, the reward matrix, the total transition matrix, and all remaining inputs;
   (D) the programmed processor evaluating the functional equation; and
   (E) the programmed processor presenting the user with decision-making advice.

2. A computer-aided decision making system according to claim 1, wherein the programmed processor additionally receives as input a discount rate, the discount rate representing a time preference for rewards.

3. A computer-aided decision making system according to claim 2; wherein the programmed processor combines the reward vectors by multiplying each of the elements of the reward vectors with each of the elements of the other reward vectors and subtracts the action cost set to form the reward matrix.

4. A computer-aided decision making system according to claim 2; wherein the programmed processor combines the reward vectors by adding each of the elements of the reward vectors to each of the elements of the other reward vectors and subtracts the action cost set to form the reward matrix.

5. A computer-aided decision making system according to claim 2; wherein the programmed processor additionally receives as input a selected reward vector, the programmed processor combines the reward vectors by multiplying each of the elements of the reward vectors with each of the elements of the other reward vectors and subtracts the action cost set multiplied by the selected reward vector to form the reward matrix.

6. A computer-aided decision making system according to claim 2; wherein the programmed processor additionally receives as input a user combination function, the user combination function defining a relationship between the action cost set and the reward vectors, the programmed processor uses the user combination function to combine the reward vectors and the action cost set to form the reward matrix.

7. A computer-aided decision making system according to claim 2; wherein the programmed processor additionally receives as input an absorbing state, the absorbing state is a state that the user can only transition to one time.

8. A computer-aided decision making system according to claim 2, wherein the programmed processor receives two state dimensions as user input.

9. A computer-aided decision making system according to claim 8, wherein the decision-making advice includes a value function and a policy function, the value function consist of a map from each combination of states in the state dimensions to a reward, and the policy function consists of a map from each combination of state dimensions to a reward maximizing action.

10. A computer implemented method for assisting a user in making a decision comprising:
    providing a computer system having a user input device, a user output device, and a processor programmed with instructions to evaluate a decision problem available to the user, the instructions programming the processor to:
    (a) using the computer system to provide the user with an option for selecting the decision problem to be solved, the user inputs information via the user input device to define the decision problem, the information including
       (i) the decision problem to be solved to maximize a reward received by the user,
       (ii) an action set, the action set has elements representing actions available to the user, each element in the action set having a corresponding action cost, the corresponding action costs forming an action cost set,
       (iii) at least two state dimensions, each state dimension has elements representing values of a condition relevant to the decision problem,
       (iv) each state dimension having a corresponding reward vector, the corresponding reward vector has reward elements representing the reward to the user associated with each of the elements of the corresponding state dimension,
       (v) each state dimension having a corresponding transition matrix, the corresponding transition matrix containing, for each element in the state dimension, a probability of moving from each state in the state dimension to each state in the state dimension for each action in the action set, and
       (vi) a time index, the time index containing decision points available to the user, each decision point representing a point in time when the user selects from the action set;
    (b) forming, by the computer system manipulating the reward vectors with the action cost set, a reward matrix, and by the computer system manipulating the transition matrices with the set of actions, a total transition matrix, (d) forming, by the computer system manipulating the state dimensions, the reward matrix, the total transition matrix and all remaining inputs, a functional equation, (e) solving, by the computer system, the functional equation; and (f) providing, by the computer system, decision-making advice.

11. A method as set forth in claim 10, wherein the step of using the computer system to prompt the user input to input information further includes the user inputting a discount rate, the discount rate representing a time preference for rewards.

12. A method as set forth in claim 11, wherein the step of forming the reward matrix, by the computer, is performed by multiplying each of the elements of the reward vectors with each of the elements of the other reward vectors and subtracting the action cost set.

13. A method as set forth in claim 11, wherein the step of forming the reward matrix, by the computer, is performed by adding each of the elements of the reward vectors with each of the elements of all of the other reward vectors and subtracting the action cost set.

14. A method as set forth in claim 11, wherein the step of inputting information additionally includes a selected reward vector, and the step of forming the reward matrix, by the computer, is performed by multiplying each of the elements of the reward vectors with each of the elements of all of the other reward vectors and subtracting the action cost set multiplied by the selected reward vector.

15. A method as set forth in claim 11, wherein the step inputting information additionally includes a user combination function, the user combination function defining a relationship between the action cost set and the reward vectors; and wherein the step of forming the reward matrix further includes the combining, according to the user combination function, the action cost set and reward vectors.

16. A method as set forth in claim 11, wherein the step of inputting information additionally includes an absorbing state, the absorbing state is a state that the user can only transition to one time.

17. A method as set forth in claim 11, wherein the step of using the user input to input information receives two state dimensions as user input.

18. A method as set forth in claim 17, wherein the step of providing the decision-making advice, by the computer, includes providing a value function and a policy function, the value function consist of a map from each combination of states in the state dimensions to a reward, and the policy function consists of a map from each combination of state dimensions to a reward maximizing action.

* * * * *